(12) United States Patent
Bedingfield, Sr.

(10) Patent No.: US 8,443,283 B2
(45) Date of Patent: May 14, 2013

(54) VISUAL SCREEN INDICATOR

(75) Inventor: James Carlton Bedingfield, Sr., Lilburn, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 338 days.

(21) Appl. No.: 12/615,904

(22) Filed: Nov. 10, 2009

(65) Prior Publication Data

US 2010/0058179 A1  Mar. 4, 2010

Related U.S. Application Data

(63) Continuation of application No. 11/264,459, filed on Nov. 1, 2005, now Pat. No. 7,627,819.

(51) Int. Cl.
*G06F 17/21* (2006.01)

(52) U.S. Cl.
USPC .......................................................... 715/273

(58) Field of Classification Search .................. 715/273
See application file for complete search history.

(56) References Cited

U.S. PATENT DOCUMENTS

| 5,634,064 A | 5/1997 | Warnock et al. |
| 7,627,819 B2 | 12/2009 | Bedingfield |

*Primary Examiner* — Doug Hutton, Jr.
*Assistant Examiner* — Tionna Smith
(74) *Attorney, Agent, or Firm* — Hartman & Citrin LLC

(57) ABSTRACT

Embodiments of the present disclosure provide systems and method for viewing electronic documents. Briefly described, one embodiment of the system, among others, includes an electronic viewer application to display contents of an electronic document; and a visual indicator logic configured to display at least one visual indicator on the electronic display, each visual indicator indicating a portion of the contents that are to be subsequently displayed on the electronic display in response to a navigation command. Other systems and methods are also provided.

20 Claims, 19 Drawing Sheets

VISUAL SCREEN INDICATOR

CROSS-REFERENCE TO RELATED APPLICATION

This application is a continuation of U.S. utility application entitled, "Visual Screen Indicator," having Ser. No. 11/264,459, now U.S. Pat. No. 7,627,819, filed Nov. 1, 2005, which is entirely incorporated herein by reference.

TECHNICAL FIELD

The present disclosure is generally related to electronic documents and, more particularly, is related to the viewing of electronic documents.

BACKGROUND

An electronic document is often provided by an author, distributor or publisher (referred to as "publisher" herein) who often desires that the document be viewed with the appearance with which it was created. This, however, creates a problem in that electronic documents are often widely distributed and, therefore, can be viewed on a great variety of hardware and software platforms.

For example, video displays or monitors being used to view an electronic document can vary in size, resolution, etc. Furthermore, various software platforms for viewing electronic documents have their own display characteristics or differences. Also, each user or "reader" of the electronic document has his or her own personal viewing preferences, which should be accommodated, if possible.

Thus, due to aforementioned reasons, only a portion of a large document may be viewed at any one time. As such, it may be difficult to read an electronic document in content flow order as only a portion of the document is shown at a time. In some computer display devices, a user is enabled to increment the amount of the document by advancing to a portion of the electronic document that follows a previously displayed portion of the document. However, in moving to a different portion of the electronic document, a user often loses focus of the point in the document that displays the new portion that was not previously displayed.

Thus, a heretofore unaddressed need exists in the industry to address the aforementioned deficiencies and inadequacies.

SUMMARY

Embodiments of the present disclosure provide systems and method for viewing electronic documents. Briefly described, one embodiment of the system, among others, includes an electronic viewer application to display contents of an electronic document and visual indicator logic configured to display at least one visual indicator on the electronic display, each visual indicator indicating a portion of the contents that are to be subsequently displayed on the electronic display in response to a navigation command.

Embodiments of the present disclosure can also be viewed as providing methods for viewing electronic documents on an electronic display. In this regard, one embodiment of such a method, among others, can be broadly summarized by the following steps: displaying a portion of an electronic document for viewing; and displaying at least one visual indicator, where each visual indicator indicates the portion of the document that is to be subsequently shown on the electronic display in response to a particular screen command.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
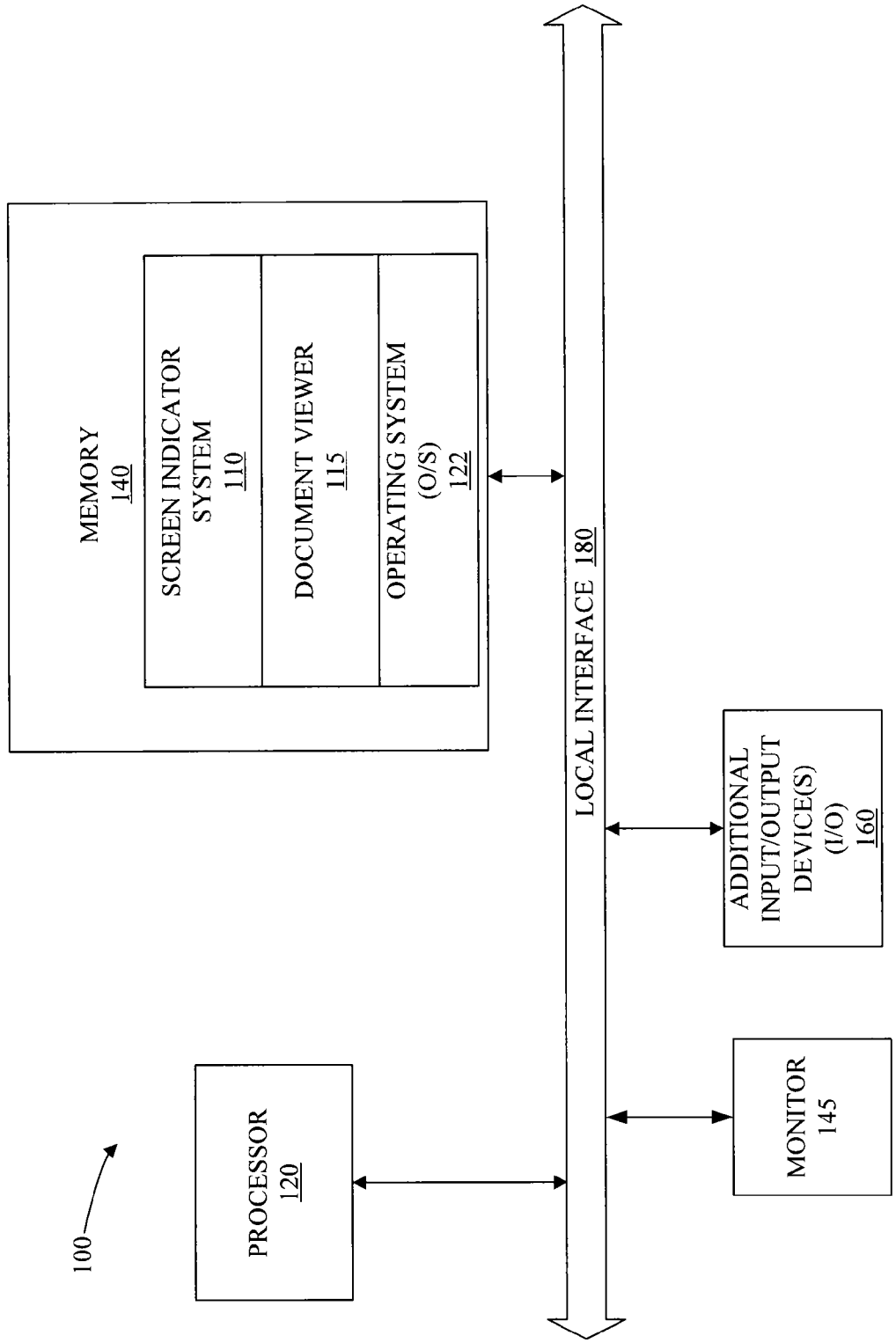
FIG. 1 is a block diagram of an electronic document display device in accordance with the present disclosure.

FIG. 1 displays a block diagram of an electronic document display device 100 in accordance with the present disclosure. The electronic display device 100 includes a processor 120, memory 140, a visual output device such as computer monitor 145, and one or more additional input and/or output (I/O) devices 160 (or peripherals) that are communicatively coupled via a local interface 180. These peripherals may be coupled to the processor 120 by electronic interfaces including input/output I/O ports, direct memory access (DMA) circuitry, registers, etc. which have not been included in the block diagram of FIG. 1 because such interfaces are well known to those skilled in the art.

The local interface 180 can be, for example but not limited to, one or more buses or other wired or wireless connections, as those skilled in the art will appreciate. The local interface 180 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

According to an exemplary embodiment, the processor 120 is a hardware device for executing software, particularly that stored in memory 140. The processor 120 can be any custom made or commercially available processor, a central processing unit (CPU), an auxiliary processor among several processors associated with the display device 100, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

A screen indicator system 110 of the present disclosure can be implemented in software (e.g., firmware), hardware, or a combination thereof. In one embodiment, the system is implemented in software, as an executable program, and is executed by a special or general purpose digital computer, such as a personal computer (PC; IBM-compatible, Apple-compatible, or otherwise), workstation, minicomputer, or mainframe computer. As such, the screen indicator system 110, in some embodiments, is a source program, executable program (object code), script, or any other entity comprising a set of instructions to be performed. When a source program, then the program needs to be translated via a compiler, assembler, interpreter, or the like, which may or may not be included within the memory 140 so as to operate properly in connection with the O/S 122. Furthermore, the screen indicator system 110 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In accordance with the present disclosure, the screen indicator system 110 may reside within storage on a local device or remotely accessible across a network.

If the electronic display device 100 is a PC, workstation, personal digital assistant, or the like, the software in the memory 140 may further include a basic input output system (BIOS) (omitted for simplicity). The BIOS is a set of essential software routines that initialize and test hardware at startup, start the O/S 122, and support the transfer of data among the hardware devices. The BIOS is stored in ROM so that the BIOS can be executed when the display device 110 is activated.

The memory 140 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 140 may incorporate electronic, magnetic, optical, and/or other types of storage media. Note that the memory 140 can have a distributed architecture, where various components are situated remote from one another, but can be accessed by the processor 120.

The software in memory 140 may include one or more separate programs, each of which comprises an ordered listing of executable instructions for implementing logical functions. In the example of FIG. 1, the software in the memory 140 includes the screen indicator system 110 in accordance with the present disclosure, an electronic document viewer application 115, and a suitable operating system (O/S) 122. A nonexhaustive list of examples of suitable commercially available operating systems 122 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system 122 essentially controls the execution of other computer programs, such as the next screen indicator system 110, and provides scheduling, input-output control, file and data management, memory management, and communication control and related services.

The I/O devices 160 may include input devices, for example but not limited to, a keyboard, mouse, scanner, microphone, etc. Furthermore, the I/O devices 160 may also include output devices, for example but not limited to, a printer, display, etc. Finally, the I/O devices 160 may further include devices that communicate both inputs and outputs, for instance but not limited to, a modulator/demodulator (modem; for accessing another device, system, or network), a radio frequency (RF) or other transceiver, a telephonic interface, a bridge, a router, etc. One input device 160 of the present disclosure includes a keyboard and an electro-mechanical or optical mouse. The input device 160 can be used to input information which is acted upon by the processor 120 to control a cursor or other pointer on a computer display, such as a computer monitor 145. Other pointer mechanisms such as trackballs, electronic pens, input tablets, joystick, touch pad, arrow keyboard controls, etc. are considered to be equivalents of the mouse.

The monitor 145 is coupled to the processor 120 and includes a screen upon which an image can be displayed. Among others, the monitor 145 may be a raster-type device (such as a video monitor or a liquid-crystal display panel) having a matrix of picture elements or "pixels" which can be selectably activated to create the image.

Figure 2:
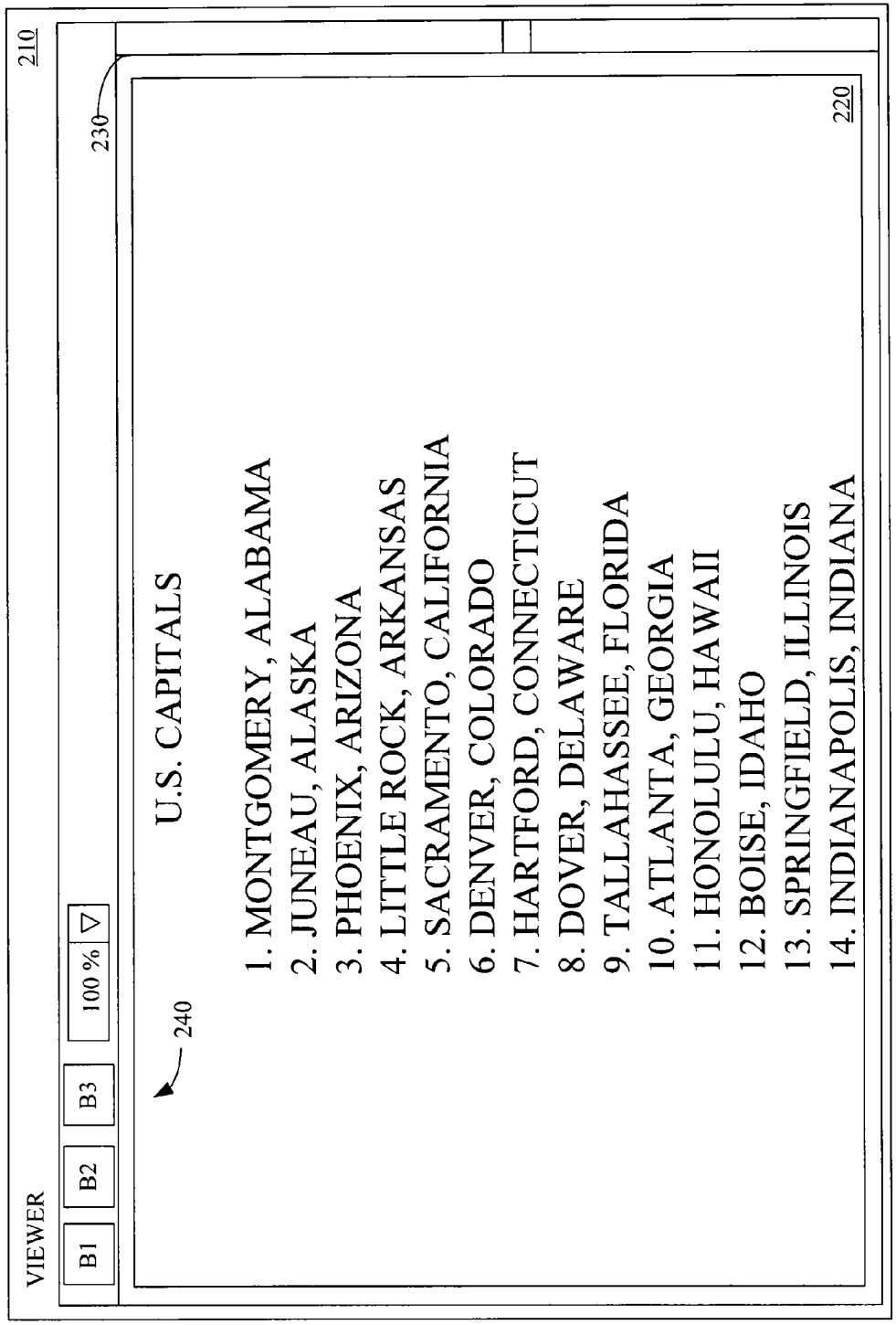
FIG. 2 is a diagram illustrating a display screen showing displayed visual representations from an electronic document in accordance with the device of FIG. 1.

FIG. 2 is a diagram illustrating a display screen 210 (of an electronic display device 100) showing displayed visual representations from an electronic document 220. The display screen 210 shows a displayed page or document representation 220 derived from data received from documents, such as, but not limited to, a portable electronic document. Page representation 220 is displayed on the screen in a view window 230 by an electronic document viewer 115 from objects stored in the portable electronic document, and may be derived from rendered bitmaps as is well known to those skilled in the art. An electronic document viewer ("viewer") 115 running on electronic display device 100 may display contents of a portable electronic document. The data representing the content is requested by the viewer 115 and received from a storage device or other computer. The viewer 115 may also offer features such as selection buttons or icons 240 that are selectable by a pointer device, such as a mouse, keyboard, etc. These features allow a user to manipulate the received data and view the page data according to user preferences. For example, selection buttons 240 similarly allow a user to view or manipulate the document in different ways by zooming, selecting the next page of the portable electronic document, etc. Other viewers and file formats can be used in other embodiments.

Page representation 220 can include several different types of visual representations, including text, graphics, images, and links Text (not shown) is derived from character codes and font objects stored in the document file. Text can be rendered into a bitmap for display on screen 210, as is well known to those skilled in the art. Graphics (not shown) can also be rendered from coded shape primitives, such as lines and rectangles, and displayed. Images (not shown) include bitmap images, such as a scanned or digitized picture, and can be displayed on screen 210 by methods well known to those skilled in the art. Links (not shown) portray a topic or idea that can be accessed by the user and, for example, can enclose special text, graphics, or images to distinguish them from normal objects. Links may be selected by the user to display a different portion of the portable electronic document that is related to the topic or idea portrayed by the link. Also, links can be linked to other electronic documents that include the topic represented by the link to provide access to those other documents. For example, on many existing network services, links to many different documents available on the network are included in electronic documents.

The viewer 115 determines the font, size, color, or other appropriate information for each object to be displayed by examining the associated font objects, color maps, size, and other information in the electronic document. In a process of displaying contents of document file, the document file may be located on a separate host computer.

An exemplary embodiment allows a user to view an electronic document on a display device of a computer. To do so, a first process involves accepting the input of commands for displaying portion(s) of electronic document in accordance with display settings. Then, a second process is performed in response to current display settings and the portion of the electronic document being displayed. This process involves indicating what portion of the electronic document that is currently being displayed will be displayed in a following screen of content. A screen of content may generally be regarded as the content that is displayed on a screen at one time with respect to current display settings.

Figure 3:
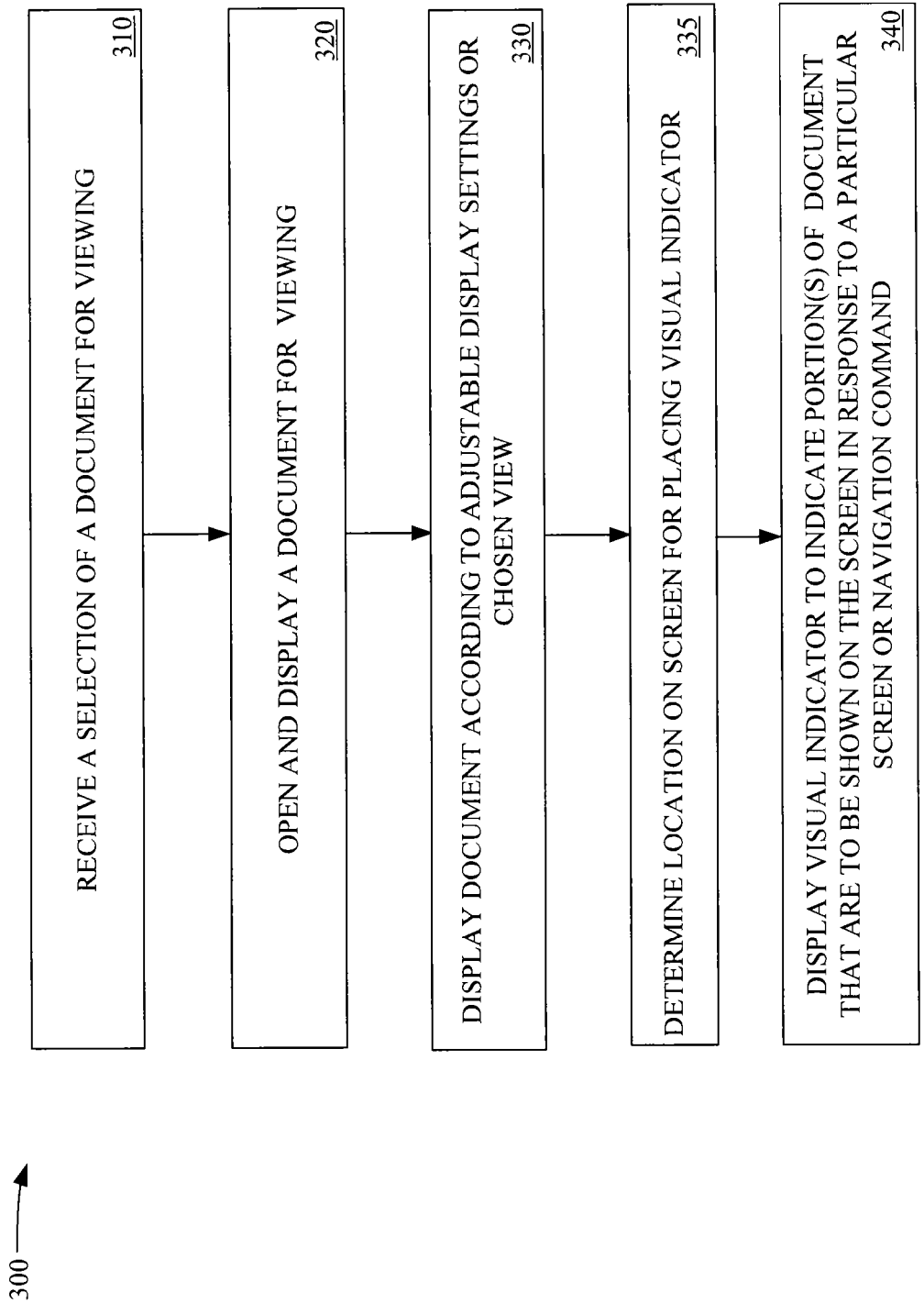
FIG. 3 is a flow chart describing a process for viewing documents in accordance with the present disclosure.

During operation, document viewer 115 allows the user to select documents for viewing (and other possible viewer options, including, editing, printing, etc.). In FIG. 3, a process 300 for viewing documents begins at block 310. In block 310, a selection of a document for viewing is received from a user. Then, in block 320, the document is opened and viewed on an electronic document display device 100. Next, the document is displayed (330) in accordance to adjustable display settings. For example, a document that is opened in a default or "normal view" may be allowed to remain in this view by a user. Alternatively, a user may change the view to a user's likening or preference. For example, if size of the text of a document is too small, a user can enlarge the text by utilizing a zoom or magnification feature provided on viewer 115. As a result, the document or a portion of the document is displayed in accordance with the chosen settings or view, as referenced in block 330.

Further, a location on the screen for placing a visual indicator is determined (335) (e.g., calculating the location of the screen where the top of the next screen of content and the bottom of the previous screen of content resides), and a visual indicator is displayed on the displayed portion of the document to indicate the portion(s) of the electronic document that are to be shown on the screen in response to a particular screen or navigation command, as shown in block 340.

Generally, a screen command is a command that prompts a different portion of an electronic document to be displayed. For example, one type of screen command is a next screen command. With a next screen command, a portion of content that follows a currently displayed portion of content within an electronic document is displayed. In some embodiments, for example, if the display screen for the electronic display device 100 allows for 20 lines of text to be displayed, then a viewer 115 shifts the content of the document being displayed 20 lines of text in response to receiving a next screen command. However, in some embodiments, a viewer may be configured to not display content from more than one page at the same time, so the amount of content that is displayed may also be limited by other display characteristics or settings. Additional ways to navigate, scroll, or "page" through a document in one embodiment of the document viewer 115 are to use direction buttons in a toolbar of the viewer 115, such as "Last Page," "Previous Page," "Next Page," and "First Page." Also, the Page Up and Page Down keys on a conventional keyboard may display the next or previous screen of content respectively of the document. Each of these aforementioned commands may be regarded as different types of screen or navigation commands, in different embodiments.

The amount of content that is displayable within confines of a display screen depends upon formatting of the document, user preferences, and display settings. For example, within a document, hard breaks are included and created at the time the document is authored. For example, in a novel comprising multiple chapters, hard page breaks may be indicated at the beginning of each chapter. That is, despite any changes in formatting of the text of the novel, there is usually a break in the text at the boundaries of each chapter. Therefore, a document viewer 115 that is configured to display no more than one page of content at a time does not display any content on a screen after a hard break that delineates the end of a page of information.

An electronic document in accordance with some embodiments of the present disclosure includes content that includes data necessary to reproduce text and images of the document. Further, in one embodiment, formatting tags are included in the electronic document and are used to control the manner in which the content itself is formatted for display. For example, formatting tags comprise Hypertext Markup Language (HTML) codes or tags, as known in the art.

Some embodiments are also directed to displaying content from other electronic documents, such as a text file or a "portable electronic document," among others. A portable electronic document is a collection of data which includes objects which have been stored in a portable electronic document language. The document is organized and stored in a "document file", which can be a storage unit such as a file, data structure, or the like.

Portable electronic documents can be stored in a variety of different languages and formats. Herein, the portable electronic document is described with reference to the Portable Document Format (PDF) by Adobe Systems, Inc. of Mountain View, Calif., or similar types of formats. PDF is a "page-based" format, in that a document includes a number of pages and may be presented to a user on a page-by-page basis, e.g., the user views one page (or a portion of a page) at a time on a display screen. Other document formats with or without similar document structures can also be adapted for use with the present disclosure. Accordingly, with such formats, a page of content may extend across one or more display screens of content. In other words, a page of content may be too large to be shown in its entirety on a screen of a display device 100 at one time. Therefore, the content is shown in parts or "more than one screen" of content on the display device 100. Accordingly, to view the electronic document, a user moves from one screen of content to the next screen of content. Likewise, a user may also move from the current screen to a "previous screen" that displays content that is located before the current screen of content within the electronic document.

In accordance with the one embodiment of the present disclosure, a document viewer 115 is configured to show a page of content of the electronic document at a time. Therefore, if the display settings are properly configured (e.g., magnification is set at 100%), a page of the electronic document may be viewable on the display device. Accordingly, using a next page command (which directs the viewer 115 to display content from a subsequent page of the document) may be adequate if the user can view the whole page on the display screen before advancing to another page. Although, even if a viewer 115 (such as a text editor) shows a whole page on a screen, the positioning of the document within the display of the viewer may drift from one screen of content to the next. For example, it is generally considered inappropriate to display a page or screen of content such that a widow (the last line of a paragraph printed by itself at the top of the displayed content) or orphan (the first line of a paragraph printed by itself at the bottom of the displayed content) occurs on the subsequent page. Therefore, display characteristics of a document viewer 115 may change from viewer application to viewer application and from page to page or screen to screen of a single viewer application 115.

As another illustrative example, if three-quarters of a page is currently being displayed and a user uses a next page command, then the remaining quarter of the page is not displayed on the next screen of content, because the viewer 115 skips it to show the content from the next page. Alternatively, if a user uses a next screen command (that directs viewer 115 to show content following currently displayed content), the viewer shifts down a part of the page to show the remaining portion of the page that was not previously shown.

In some embodiments, when a next screen command is received, the next page of the document is shown on the display screen. However, if the display settings are configured such that less than a page of content is viewable on the screen (e.g., magnification is set at 120%), when a next screen command is received, the remaining portion of the content from the same page is then displayed. So, a page of content is displayed over several screens of content. Further, even if content displayed on a screen includes portions from more than one page, the top of the content shown on a screen may repeat content from a previous screen that has already been viewed and may do so intermittently.

For an electronic document that is presented for reading on an electronic device (PC, PDA, PDF client, web browser client, text editor, TIF viewers, etc.), a user generally desires to view more of the contents of the document being displayed currently on the display. Thus, at some point, a user desires to move to another screen of content, whether a previous screen or a next screen. However, when the portion of a document being displayed moves to a next screen, a user often loses focus or his or her positioning within the document, whether a user utilizes the option of a hand-style cursor tool, scroll bar, "elevator shaft" or vertical bar, next page GUI tool, page down button on keyboard, scroll wheel on mouse, etc. to progress through the document. Further, as a user scrolls horizontally to view displayed content that exceeds the width of the screen, the user may also lose focus.

Thus, in accordance with the present disclosure, it is advantageous to have a visual indicator demonstrate how the document is subsequently going to be displayed in response to implementation of a particular screen command (e.g., a next screen command) by a viewer 115. To do so, the document viewer 115 performs calculations to determine the positioning of the document in relation to viewing window 230 within the display screen, and places a visual indicator to indicate where the top of content for the next screen is to be within the viewing window 230. For example, in one embodiment, all of or a portion of the contents of the electronic document are loaded into a memory buffer of the document viewer 115, such that content not currently being displayed may be referenced to determine the positioning of the document in response to a particular navigation command.

According to an exemplary embodiment, the document viewer 115 positions the visual indicator by anticipating a particular screen command and monitors and updates the position of the visual indicator for changes in display views and settings. For example, if a user scrolls down a document that is being displayed a couple of lines, then the visual indicator may move down a couple of lines also. However, if the scrolling down of the document results in the bottom of the current page to be shown, then the visual indicator may not move, since completely new content would be displayed in response to a next screen command, and thus the visual indicator remains positioned at the bottom of the screen content regardless of the scrolling within the same page.

Figure 4:
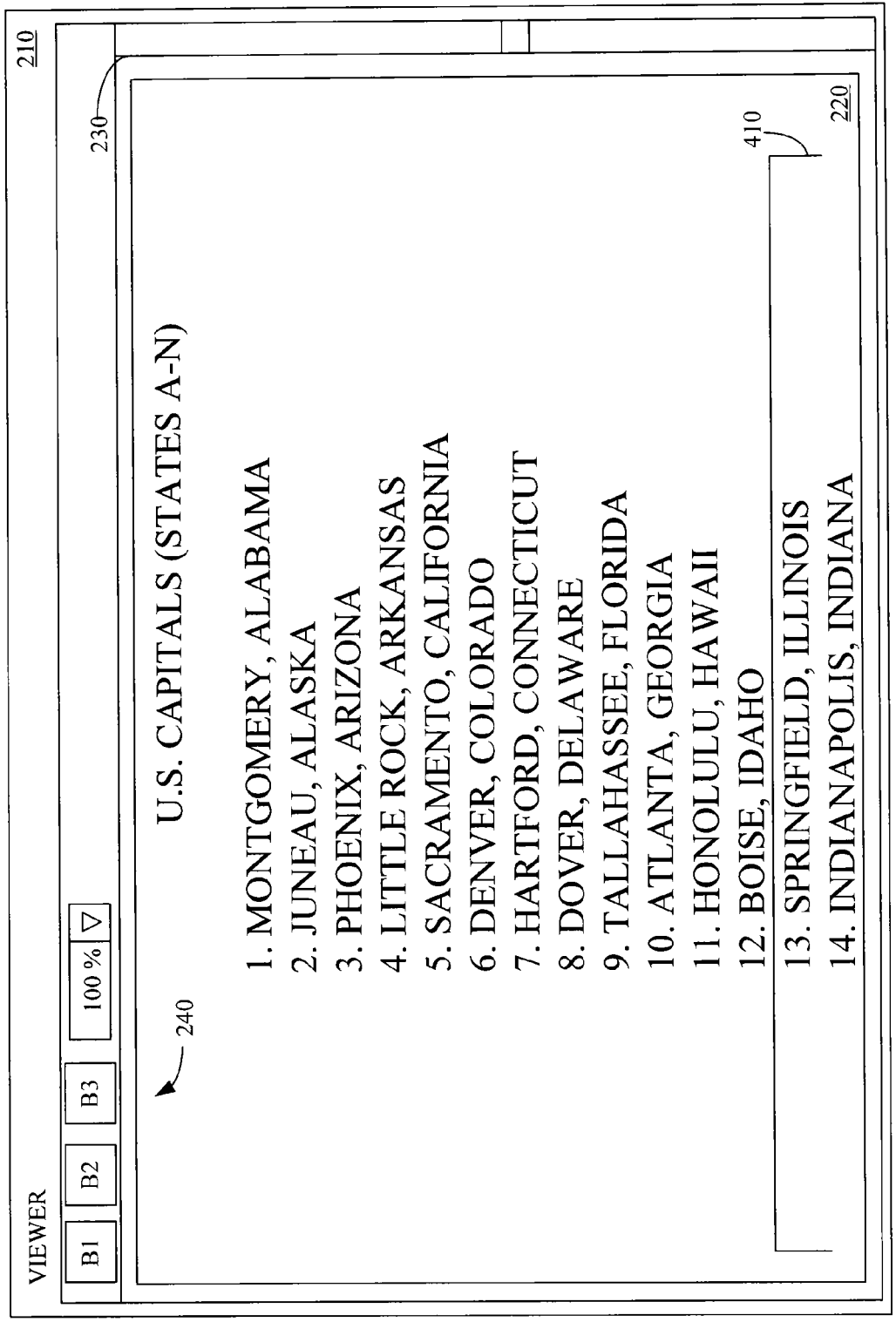
FIGS. 4-9 are diagrams illustrating a viewing session of an electronic document utilizing a visual indicator for a next screen command in accordance with the device of FIG. 1.

Referring now to FIG. 4, a diagram illustrating a viewing session of an electronic document utilizing a visual indicator is shown. In FIG. 4, a visual indicator 410 is used to point to the top of a portion of a representation 220 of an electronic document being displayed that corresponds to the position (or close to the position) of the portion (e.g., next line) of the document that is to be displayed for a particular screen command. In this particular example, the visual indicator 410 is associated with a next screen command.

The visual indicator 410 points to the line of a document portion which will also be displayed in the view window 230 of the document viewer 115 in response to receiving a particular screen command. The visual indicator 410 is provided so that readers do not lose their place when a new portion of the document is displayed in the view window 230 in response to a particular screen command. Therefore, the visual indicator 410 minimizes the problem of having readers searching for the next line of text to read in an article after a new document portion is displayed in the view window 230.

In the example of FIG. 4, the visual indicator 410 is a line (or bar) that delineates and partially frames the portion of the document that is to be repeated on the screen if a next screen command is received. As shown, the bar 410 indicates what portion of the current content (e.g., "13. Springfield, Ill. 14. Indianapolis, Ind.") that is to be displayed if the user "screens down" the contents of the document utilizing a next screen command.

Therefore, a user in reading the contents shown in FIG. 4 would know where to stop reading in the current screen to pick up the next line of content in the next screen. Accordingly, FIG. 5 shows the screen contents in response to a next screen command that is received and acted upon by the viewer 115.

Figure 5:
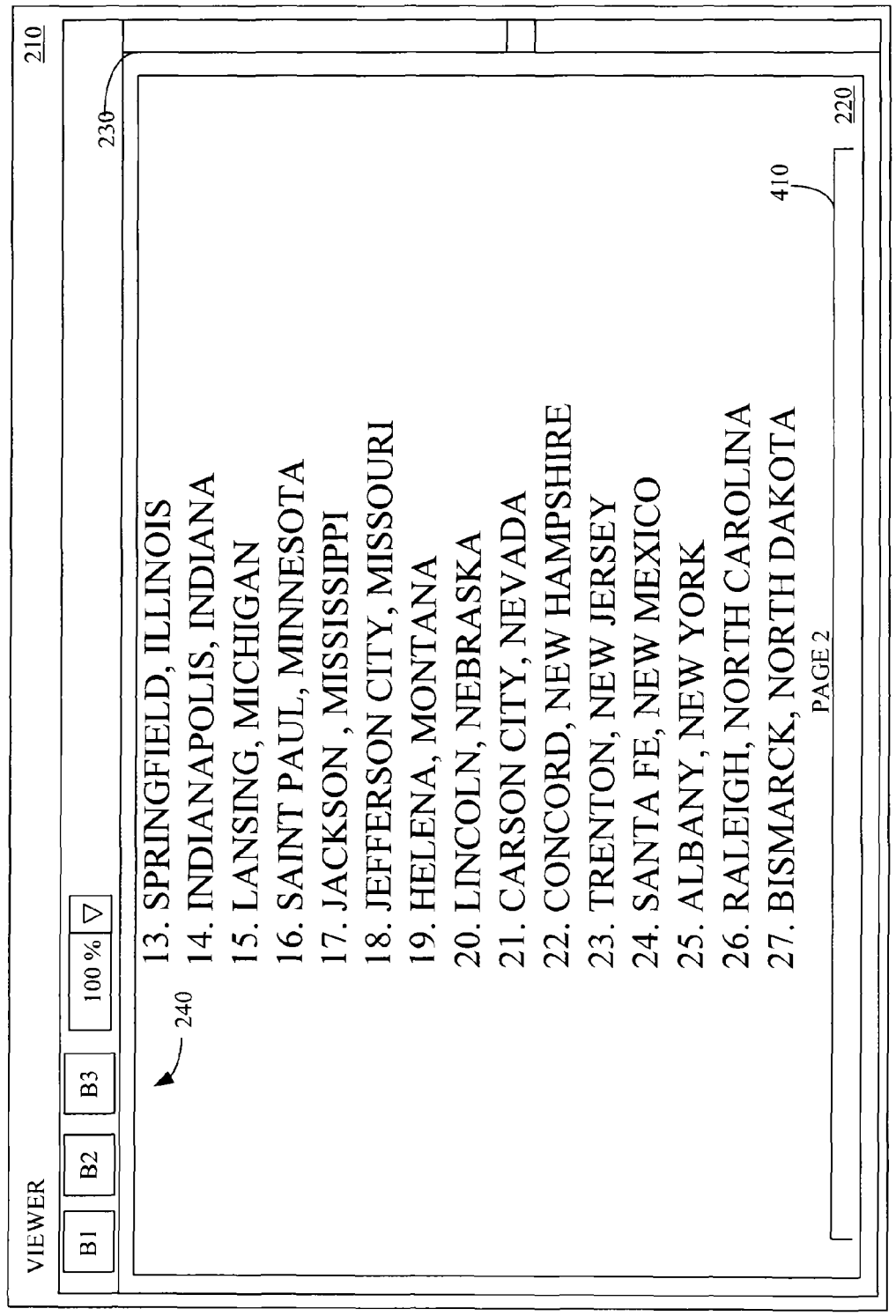

As indicated in the previous screen shown in FIG. 4, the screen of content shown in FIG. 5 begins with the content (e.g., "13. Springfield, Ill. 14. Indianapolis, Ind.") indicated by the visual indicator 410 displayed in FIG. 4. For the screen content currently being displayed in FIG. 5, the visual indicator 410 indicates that none of the currently displayed content is to be repeated in a subsequent screen in response to a next screen command. As previously explained, some viewers are configured to prohibit displaying of content from multiple pages at one time on a screen. Therefore, in the example of FIG. 5, since content from the bottom of the page is being shown, none of the content is to be repeated when content from the following page is shown in response to a next screen command.

Figure 6:
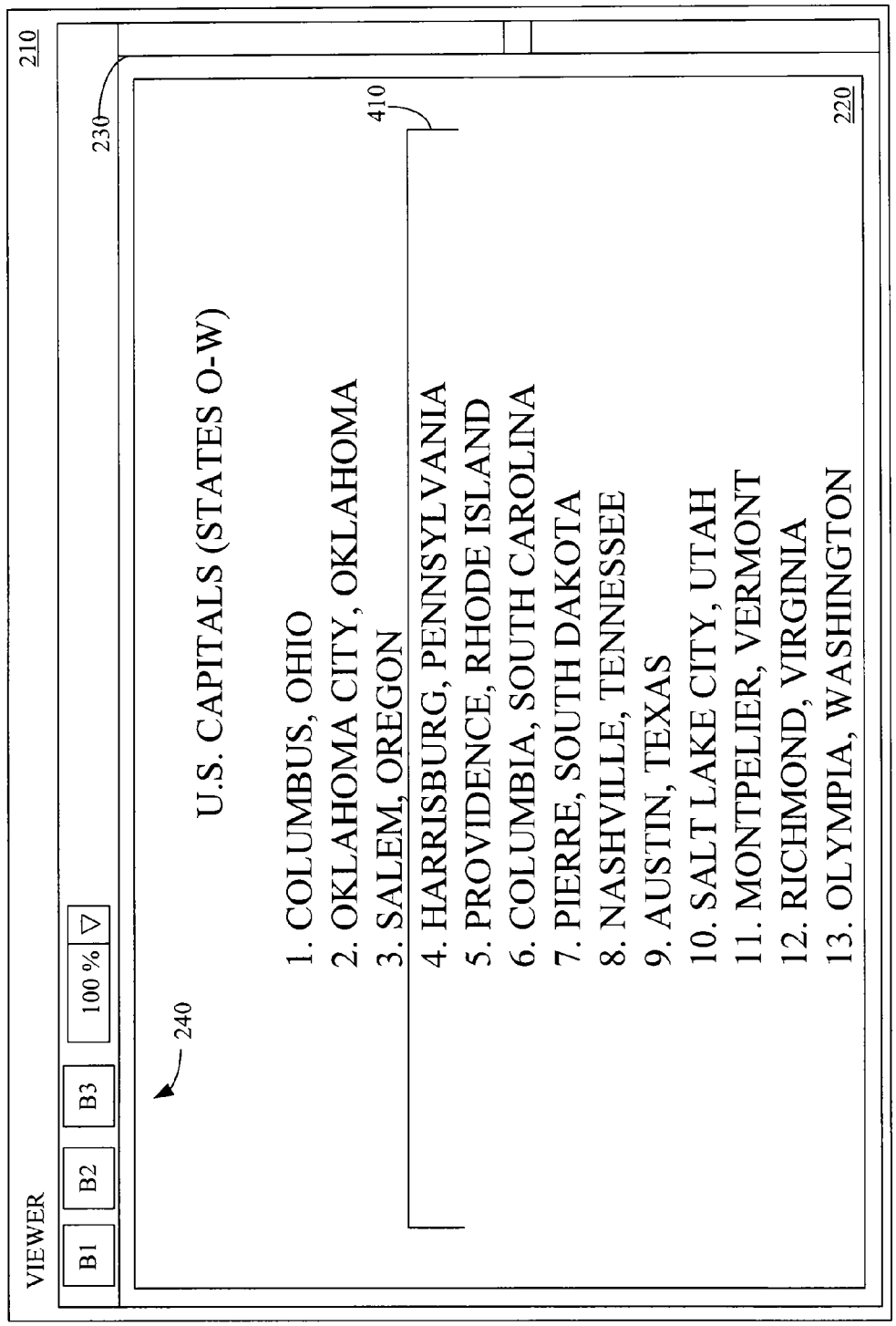
Figure 7:
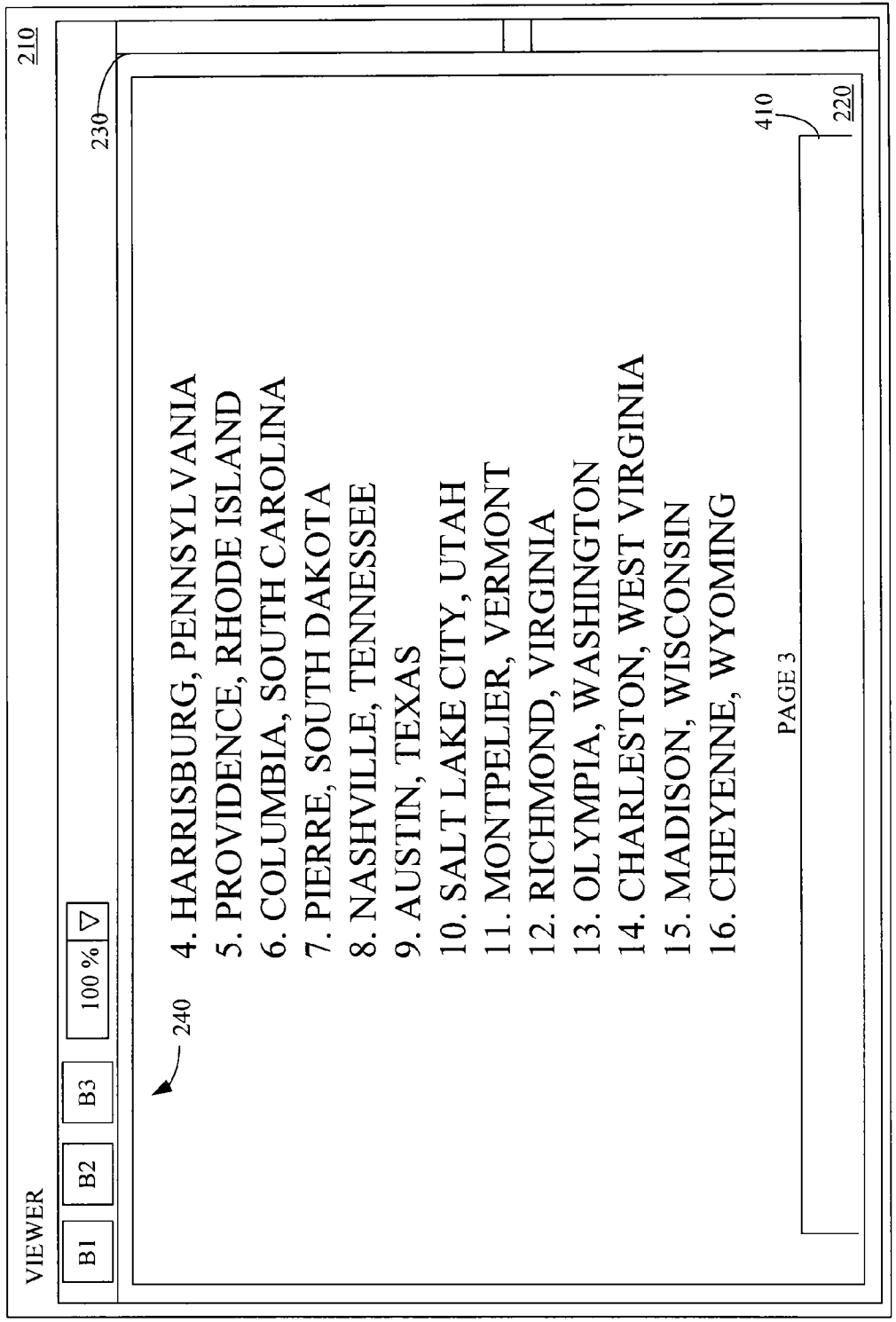
Figure 8:
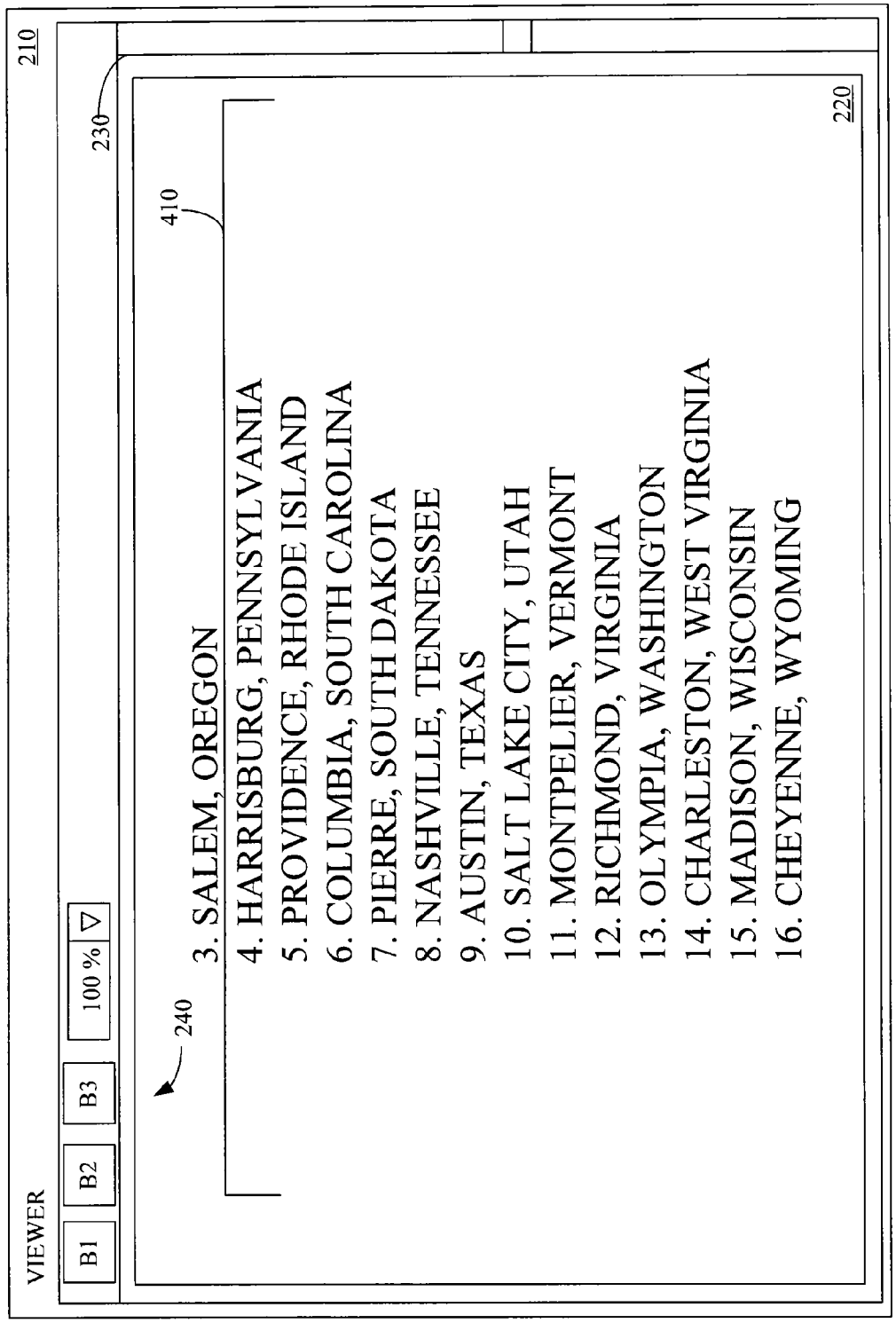
Figure 9:
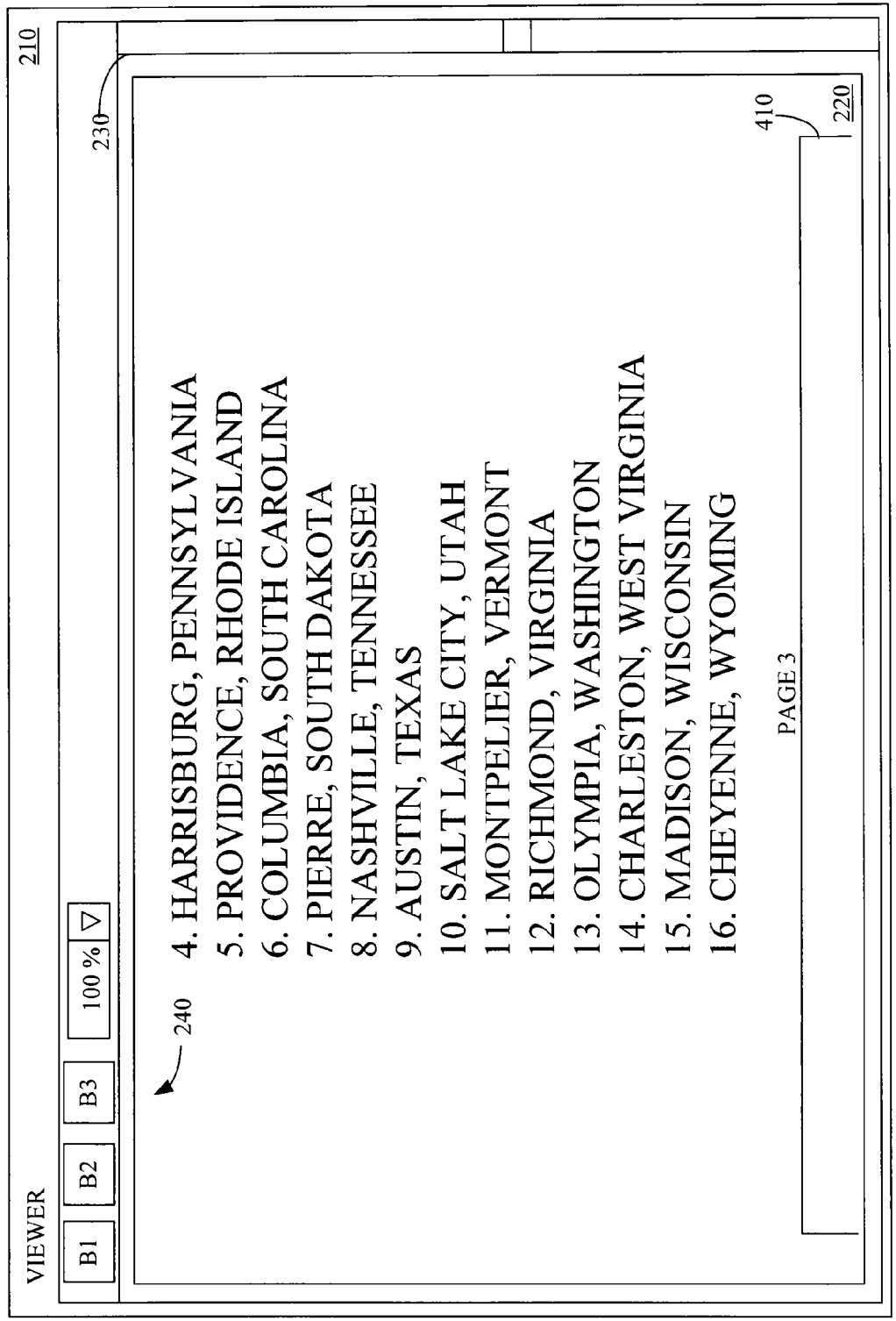

Correspondingly, FIG. 6 shows screen content that results from a next screen command received by the viewer 115, while the content of FIG. 5 is being shown. In this example, the visual indicator shows that the next screen of content is to start with the displayed content starting at "4. Harrisburg, Pa." Accordingly, FIG. 7 displays the screen content after receiving the next screen command, which starts with the line containing "4. Harrisburg, Pa." Again, since the content shown in FIG. 7 includes the content of the bottom of this page, the visual indicator indicates that none of the displayed content is to be repeated in response to a next screen command. FIGS. 8 and 9 provide an additional example where most of the content displayed in FIG. 8 is repeated on the screen of FIG. 9 in response to a next screen command, since the content of FIG. 8 showed most, but not all, of the content at the bottom of the page ("page 3") of the document being displayed.

Embodiments of the present disclosure are capable of being utilized regardless of whether a document is vector, bitmap, or text based. Viewers 115 of the present disclosure generally configure document displays based upon screen and document parameters and can determine advance positioning of a document in anticipation of receiving a screen or navigation command. Further, embodiments of visual indicators of the present disclosure are not limited to being associated with only one navigation or screen command. For example, a visual indicator may be used to indicate the positioning of currently displayed text in response to a previous screen command, or a page up command, etc. For example, FIGS. 10-13 illustrate a sample viewing session utilizing a visual indicator for a previous screen command.

Figure 10:
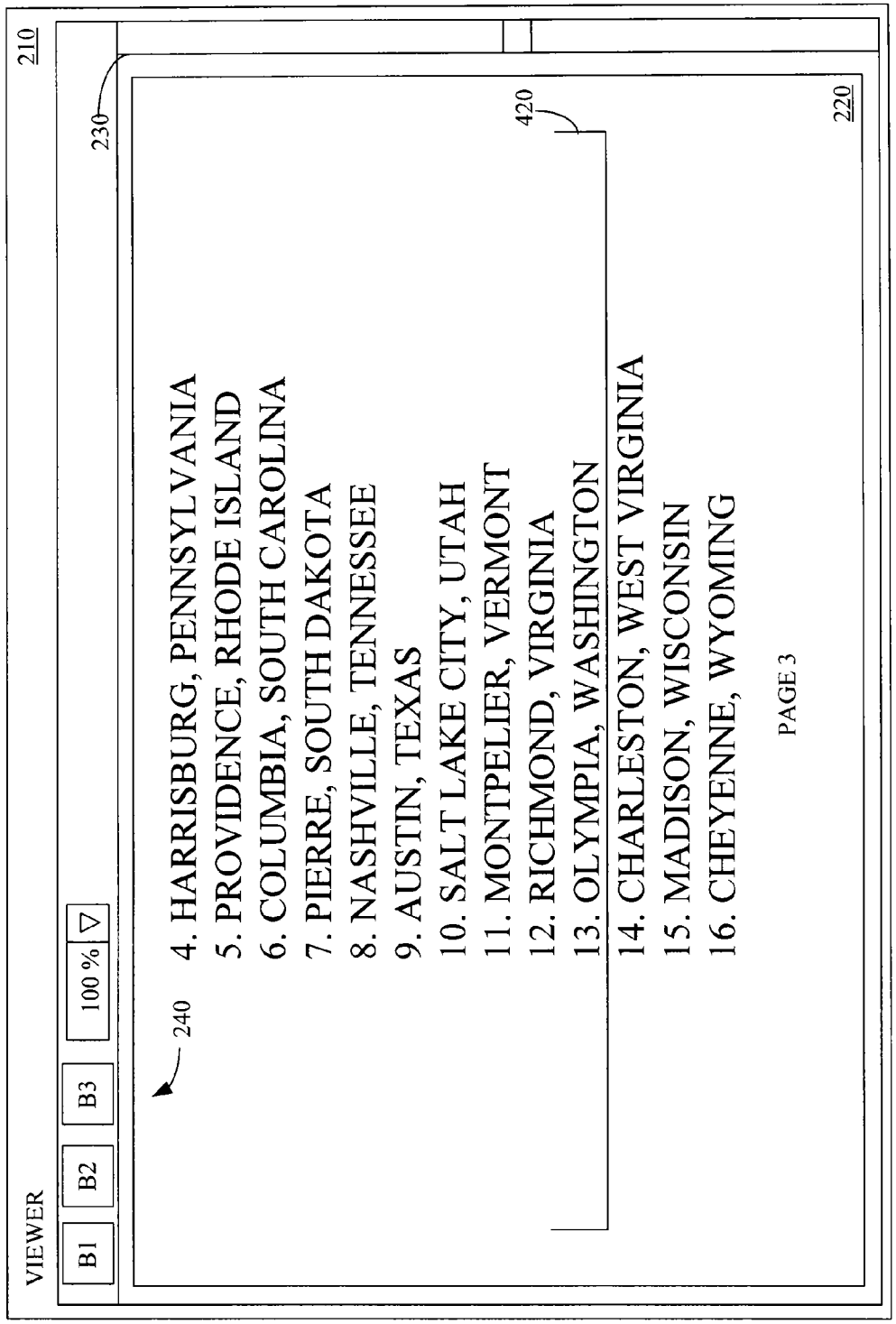
FIGS. 10-13 are diagrams illustrating a viewing session of an electronic document utilizing a visual indicator for a previous screen command in accordance with the device of FIG. 1.

With regard to FIG. 10, the visual indicator 420, as represented by a bar framing a portion of the displayed content, indicates that the portion of the content above "13. Olympia, Wash." is to be repeated on the screen of the display device in response to a previous screen command. Accordingly, FIG. 11 then shows the screen content that is displayed if the previous screen command is received and acted upon by the viewer 115, which corresponds to the content indicated by the visual indicator 420 of FIG. 10.

Figure 11:
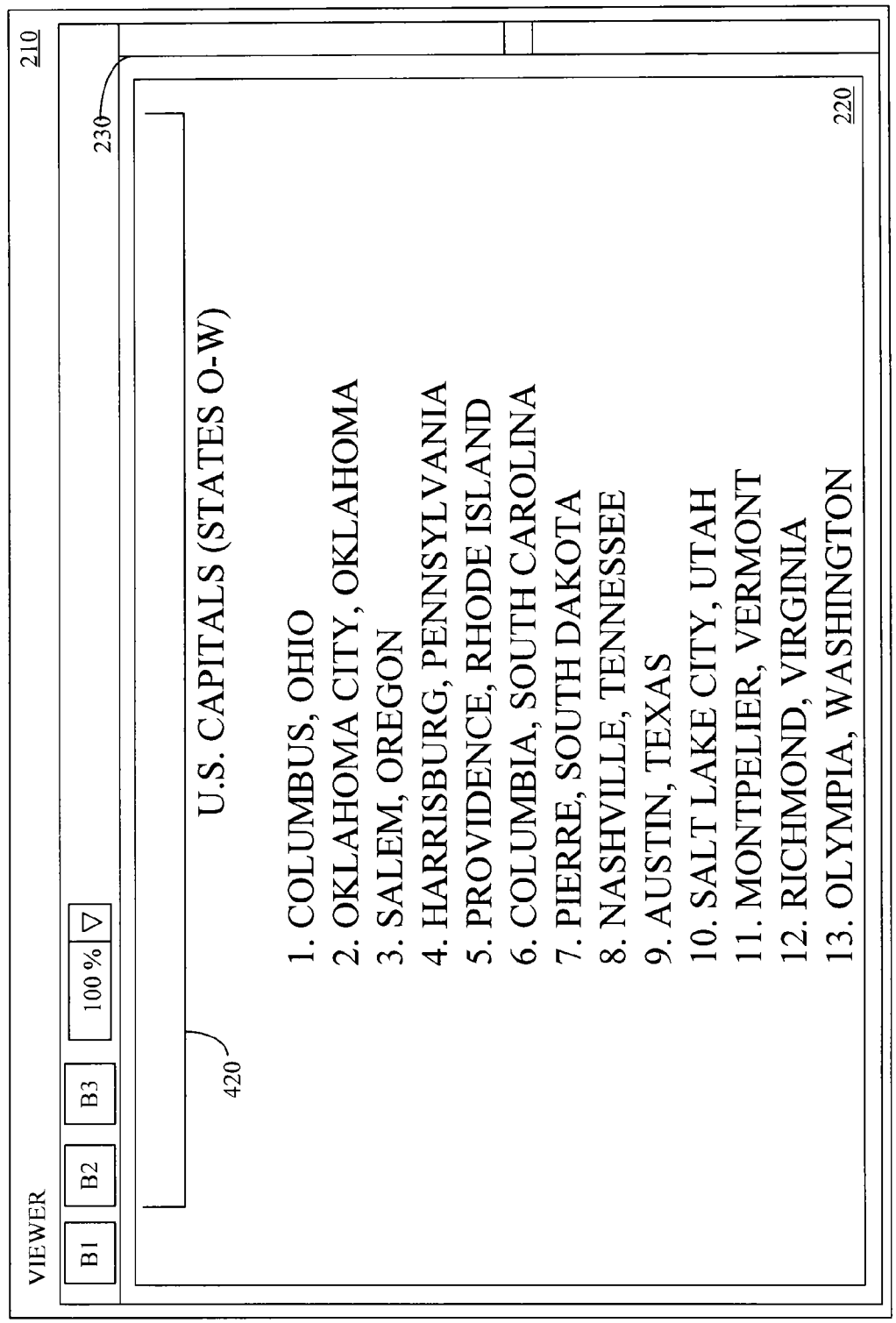

In FIG. 11, the displayed content is that of a top of a page of a document. Therefore, the visual indicator 420, in FIG. 11, indicates that none of the displayed content is to be repeated on a resulting screen in response to a previous screen command. Note, in this example, it is assumed that the viewer 115 does not display content from multiple pages of the document at the same time on the display screen.

Figure 12:
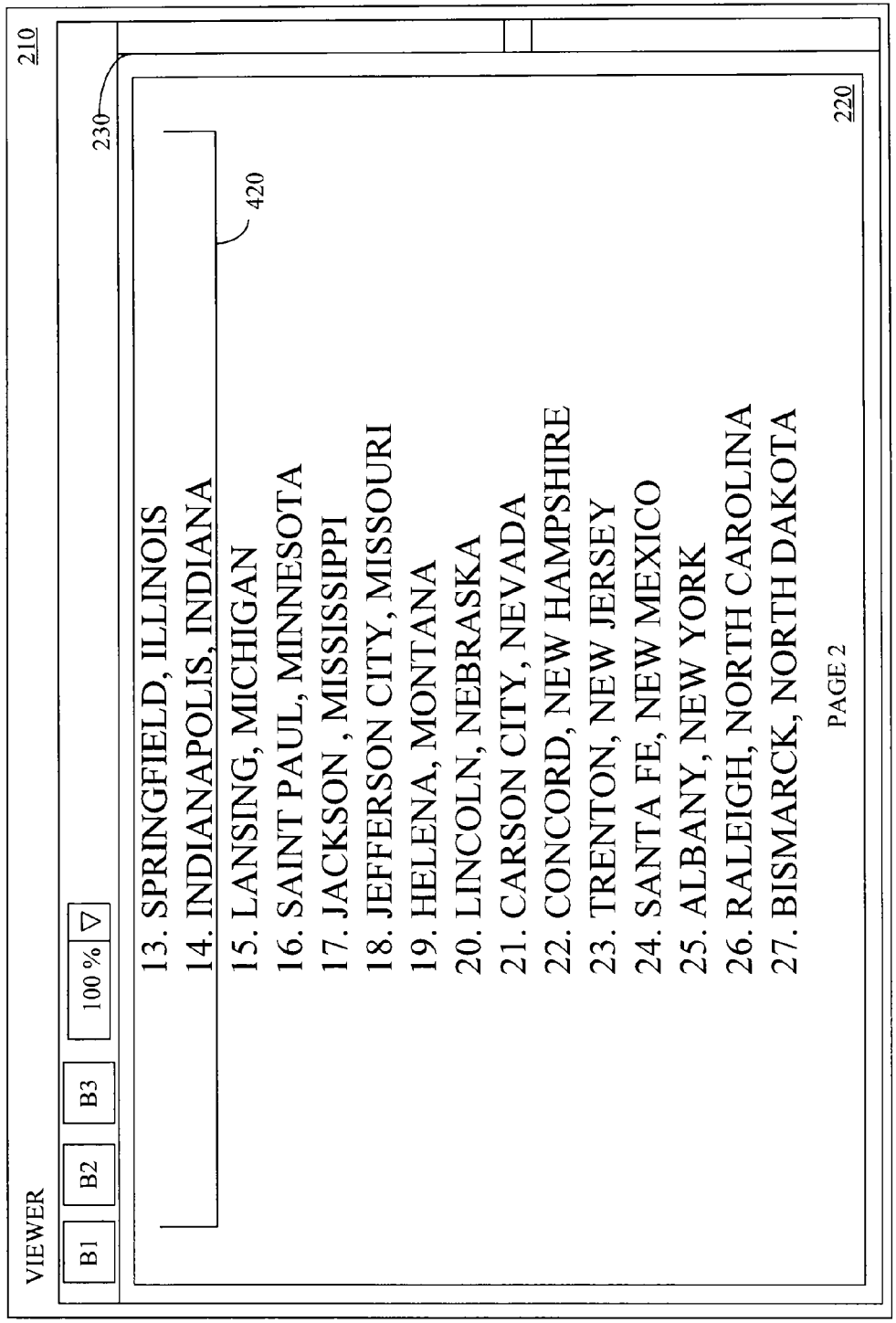
Figure 13:
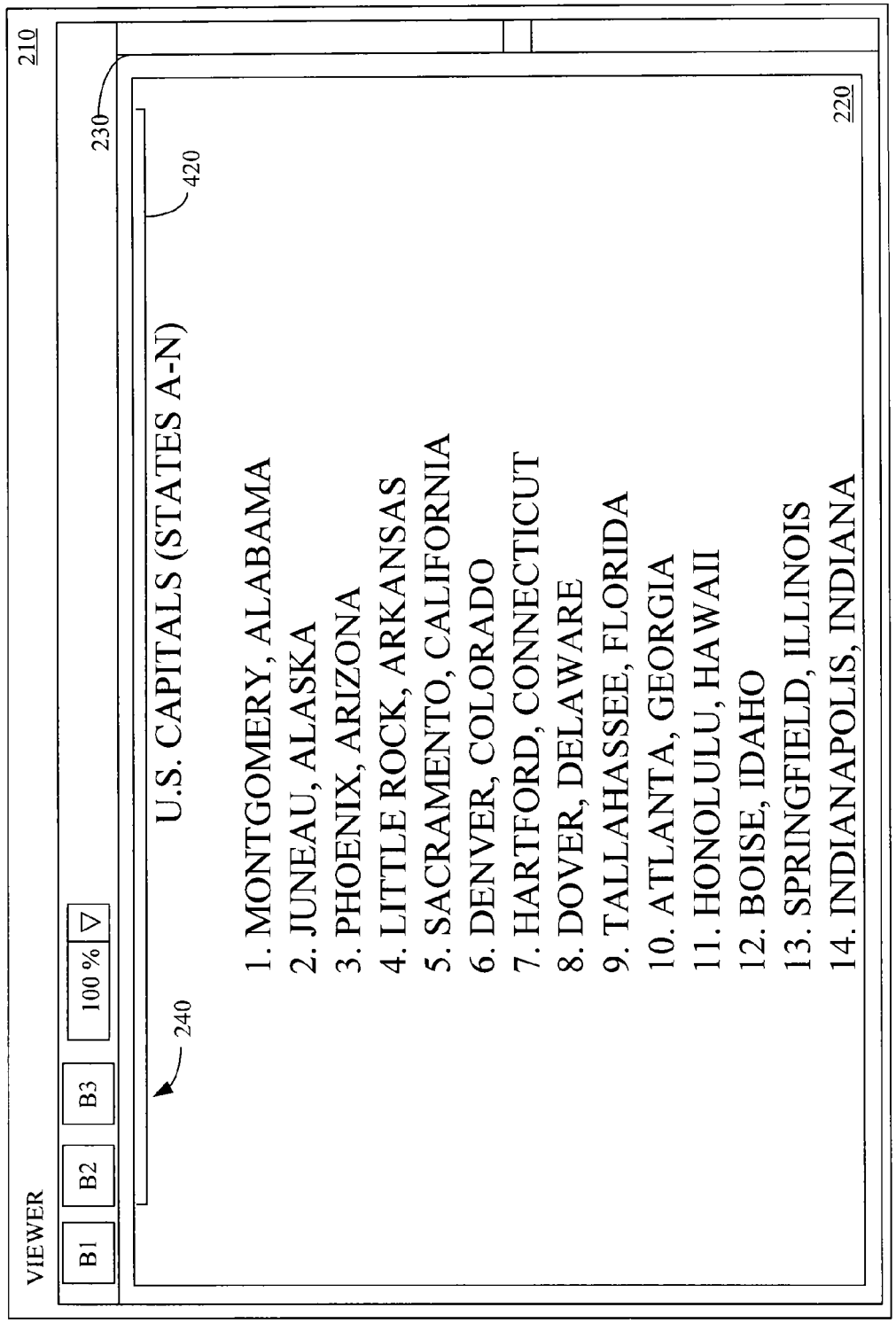

Next, FIG. 12 shows the content that results from a previous screen command that is acted upon by the viewer for the screen content of FIG. 11. In this example, the visual screen indicator 420 indicates that the content above "14. Indianapolis, Ind." is to be repeated on the screen in response to a previous screen command, which is confirmed by the screen content of FIG. 13.

Figure 14:
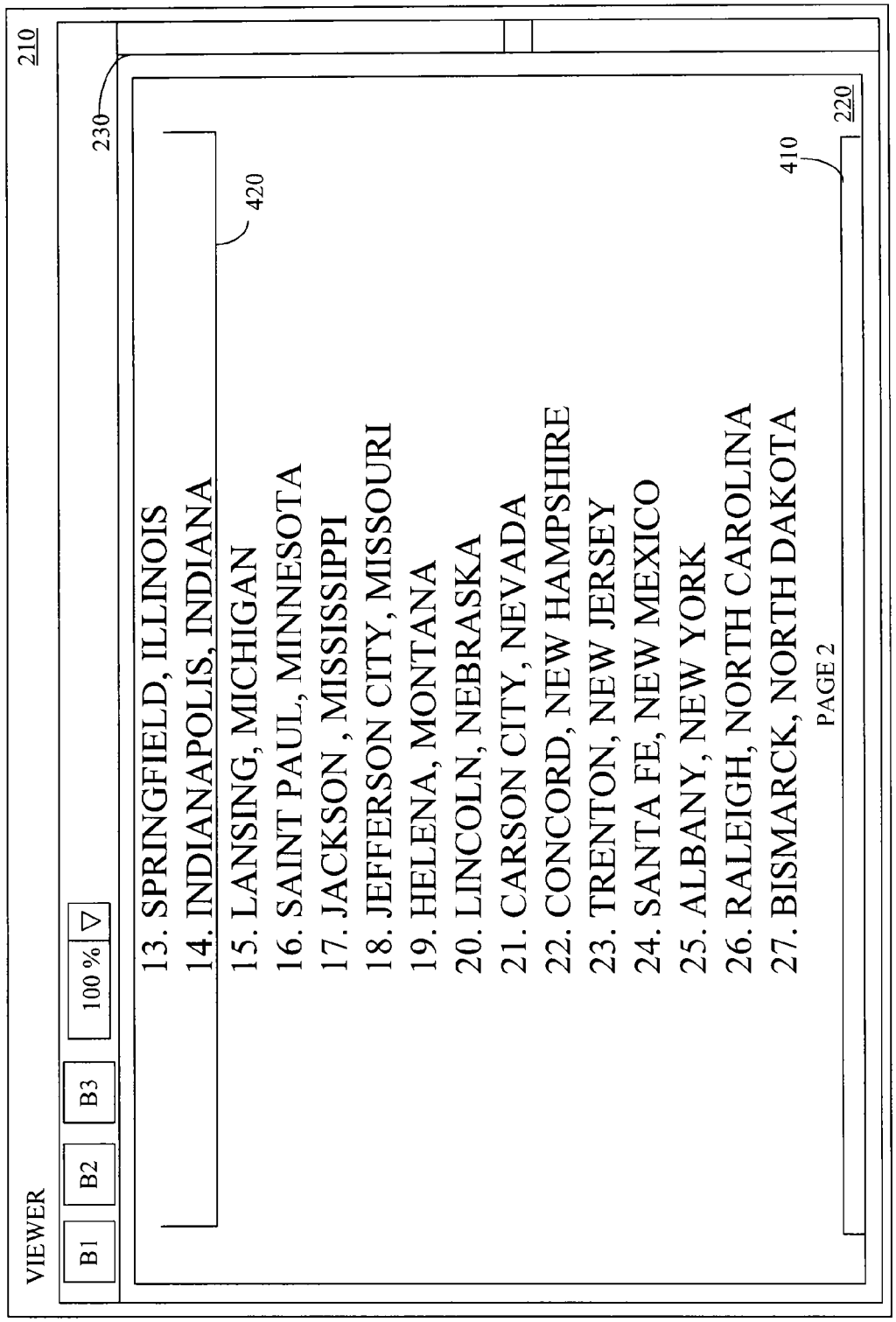
FIGS. 14-15 are diagrams illustrating a viewing session of an electronic document utilizing multiple visual indicators for a previous screen command and a next screen command in accordance with the device of FIG. 1.

Multiple visual indicators may also be displayed to facilitate viewing of electronic documents. For example, FIG. 14 shows screen content utilizing two visual indicators, 410, 420. The visual indicator 420 at the top is associated with a previous screen command, and the visual indicator 410 is associated with a next screen command, as previously described. Also, the screen content shown in FIG. 14 corresponds to the screen content also of FIG. 5 and FIG. 12. Therefore, if a next screen command is received and acted upon for the content displayed in FIG. 14, the displayed content will correspond to the displayed content of FIG. 6 with the addition of two visual indicators being displayed instead of just one. Alternatively, if a previous screen command is received and acted upon for the content displayed in FIG. 14, the resulting displayed content will correspond to the screen content of FIG. 13 with the addition of two visual indicators being displayed instead of just one.

Figure 15:
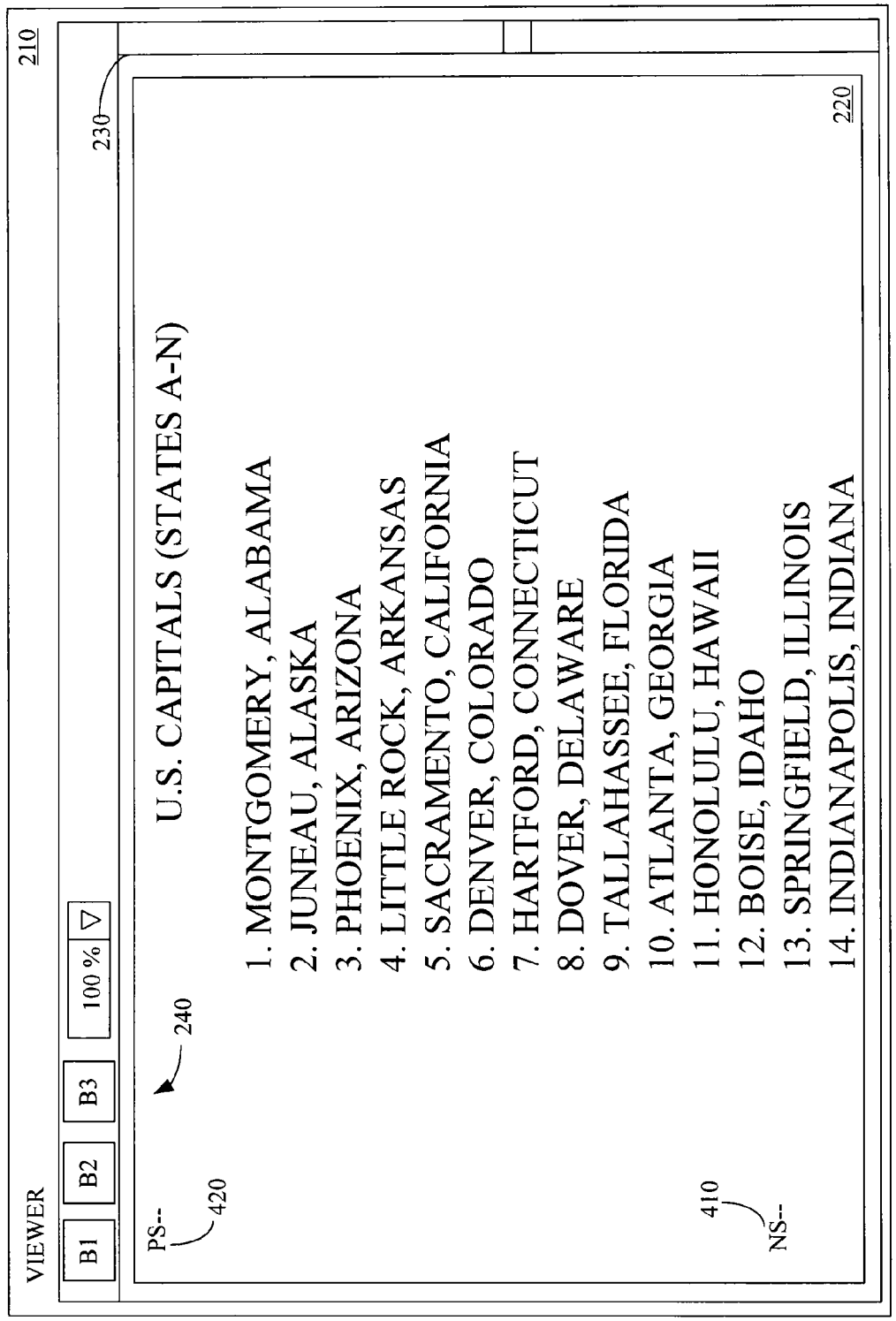

It should be noted that there are a variety of ways of representing a visual indicator, and thus, such representations should not be limited to the examples previously described in the figures. For example, FIG. 15 is a diagram of a viewing session showing a "PS-" representation 420 for the visual indicator of a previous screen command and a "NS-" representation 410 for the visual indicator of a next screen command.

Figure 16:
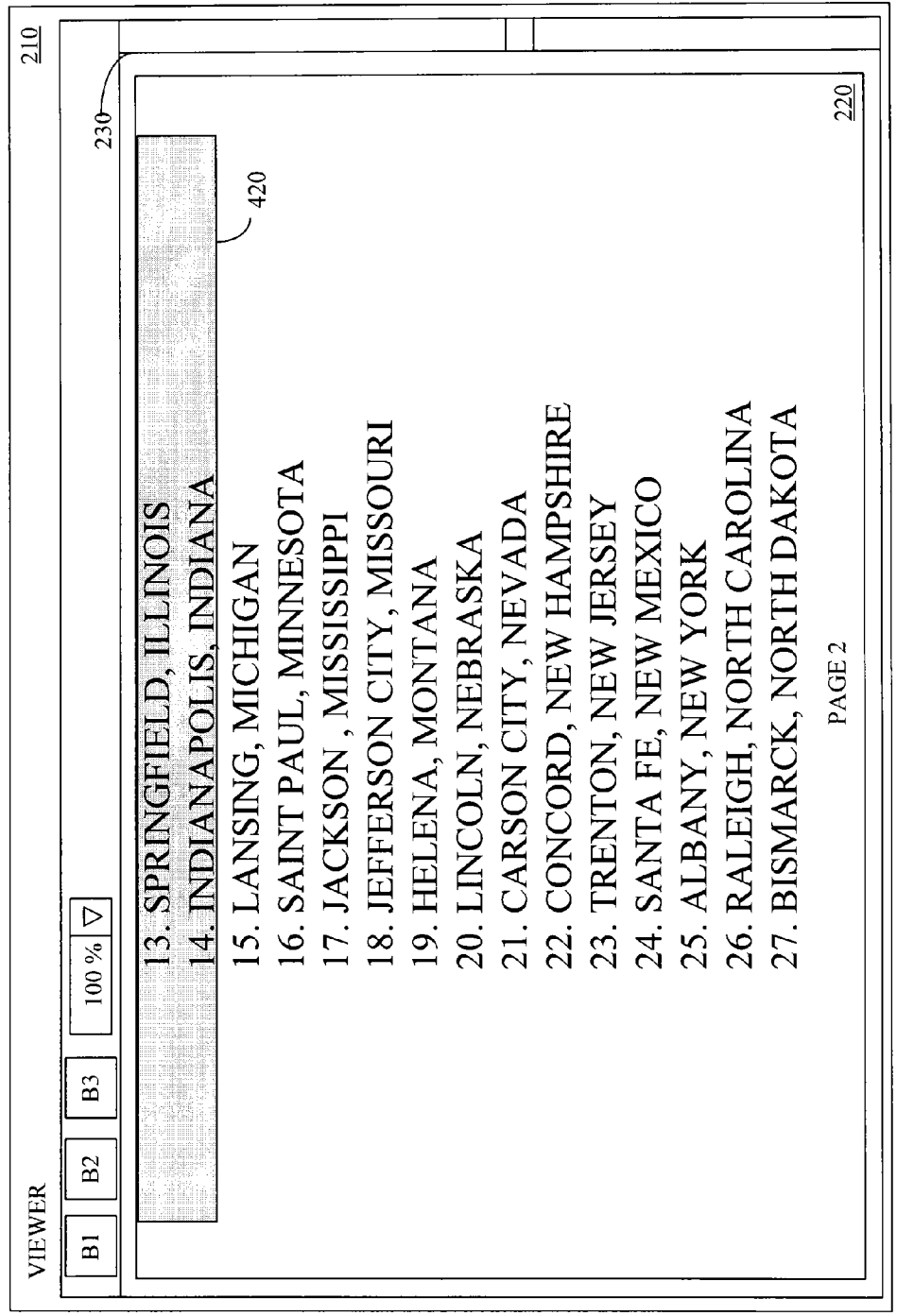
FIG. 16-18 are diagrams illustrating a viewing session of an electronic document utilizing visual indicators featuring shading in accordance with the device of FIG. 1.

As another example, FIG. 16 displays a shading representation 420 of a visual indicator for a previous screen command where the portion contained in the transparent or semi-transparent shaded area is to be repeated on the display if the previous screen command is implemented. Correspondingly, FIG. 17 demonstrates a shading representation 410 of a visual indicator for a next screen command where the portion contained in the shading area is to be repeated on the display if the next screen command is implemented.

Figure 17:
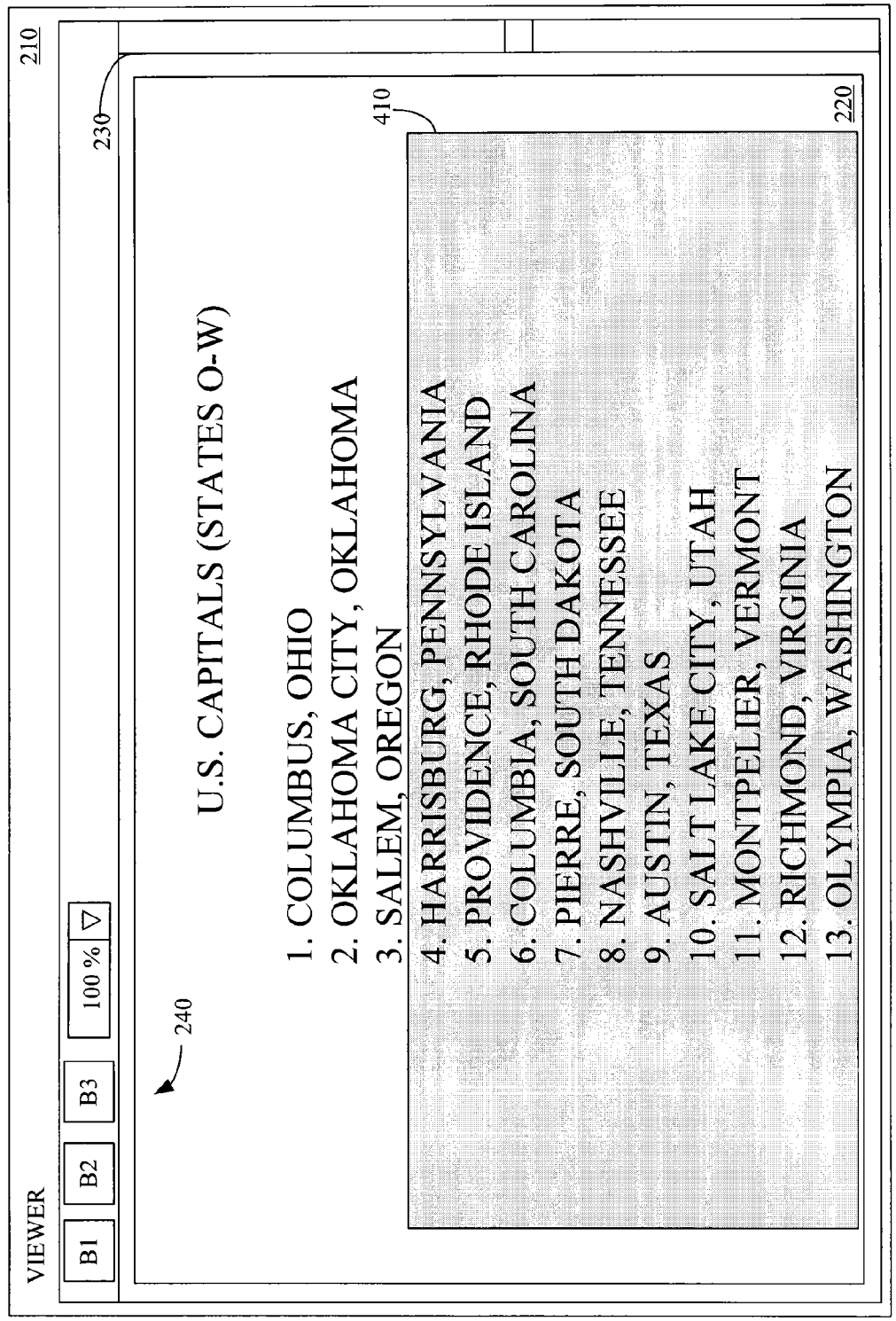
Figure 18:
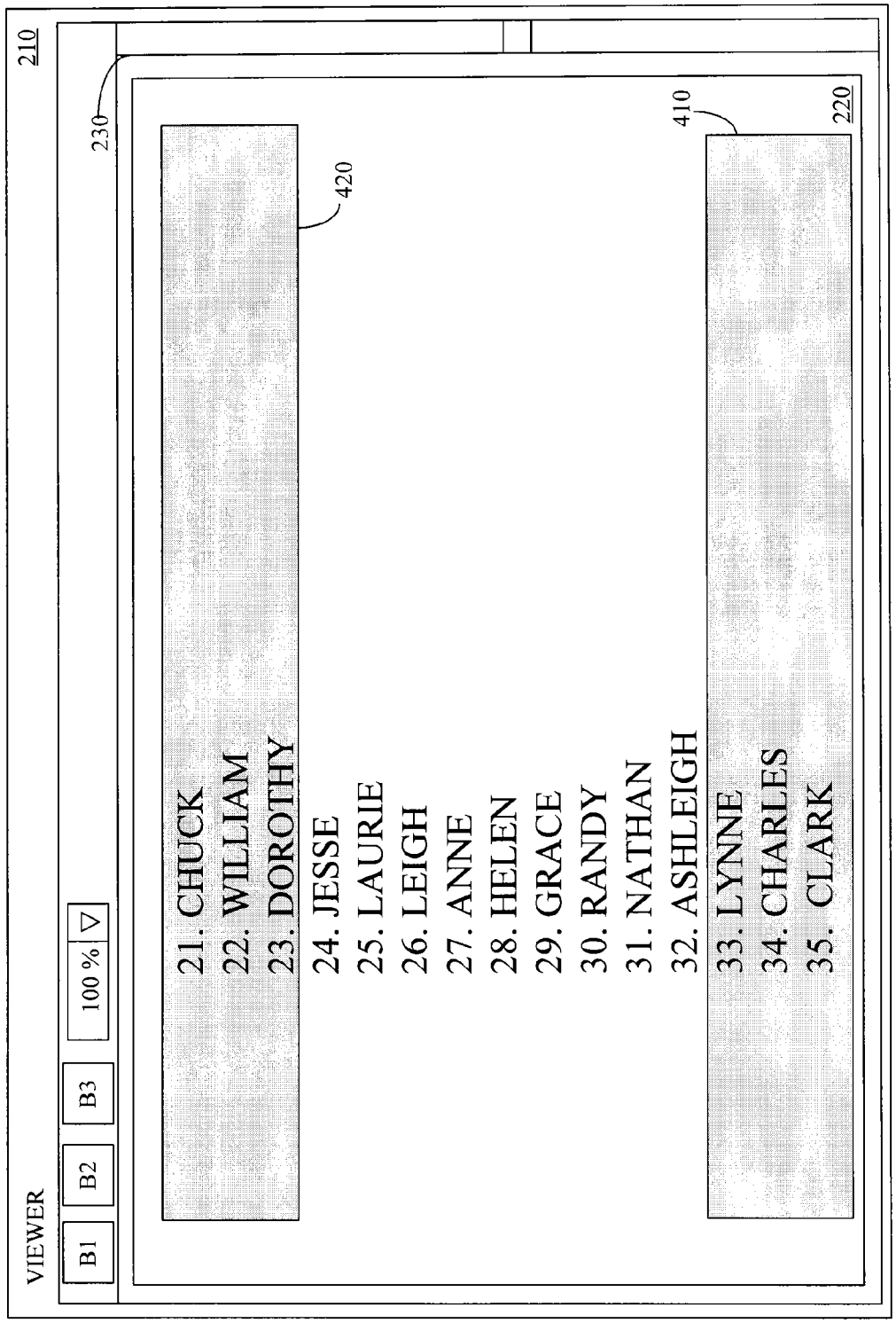

Further, FIG. 18 demonstrates a viewing session utilizing both shading techniques of FIG. 16 and FIG. 17 for multiple visual indicators 410, 420. In this example, the portion of the screen content not shaded is the portion of the content that is to not to be displayed in a subsequent screen of content. Therefore, advantageously, a user may focus on reading the non-shaded content of consecutive screens to easily avoid reading redundant portions of the document while viewing content from screen to screen. Note, additional embodiments include different variations of the visual indicator representations (e.g., utilizing geometric symbols, icons, etc.) and also include interactive options for the visual indicators. For example, activation of the visual indicators may be configured to computer mouse movement and control. For example, if a computer mouse in a particular area of the screen or interface (e.g., near a navigation toolbar), then a visual indicator is activated and displayed. If the computer mouse moves out of the particular area, then the visual indicator is deactivated and not displayed. Further, activation of a visual indicator may be configured with timer settings, such that the visual indicator appears after a set amount of time after a navigation or screen command is initiated.

Figure 19:
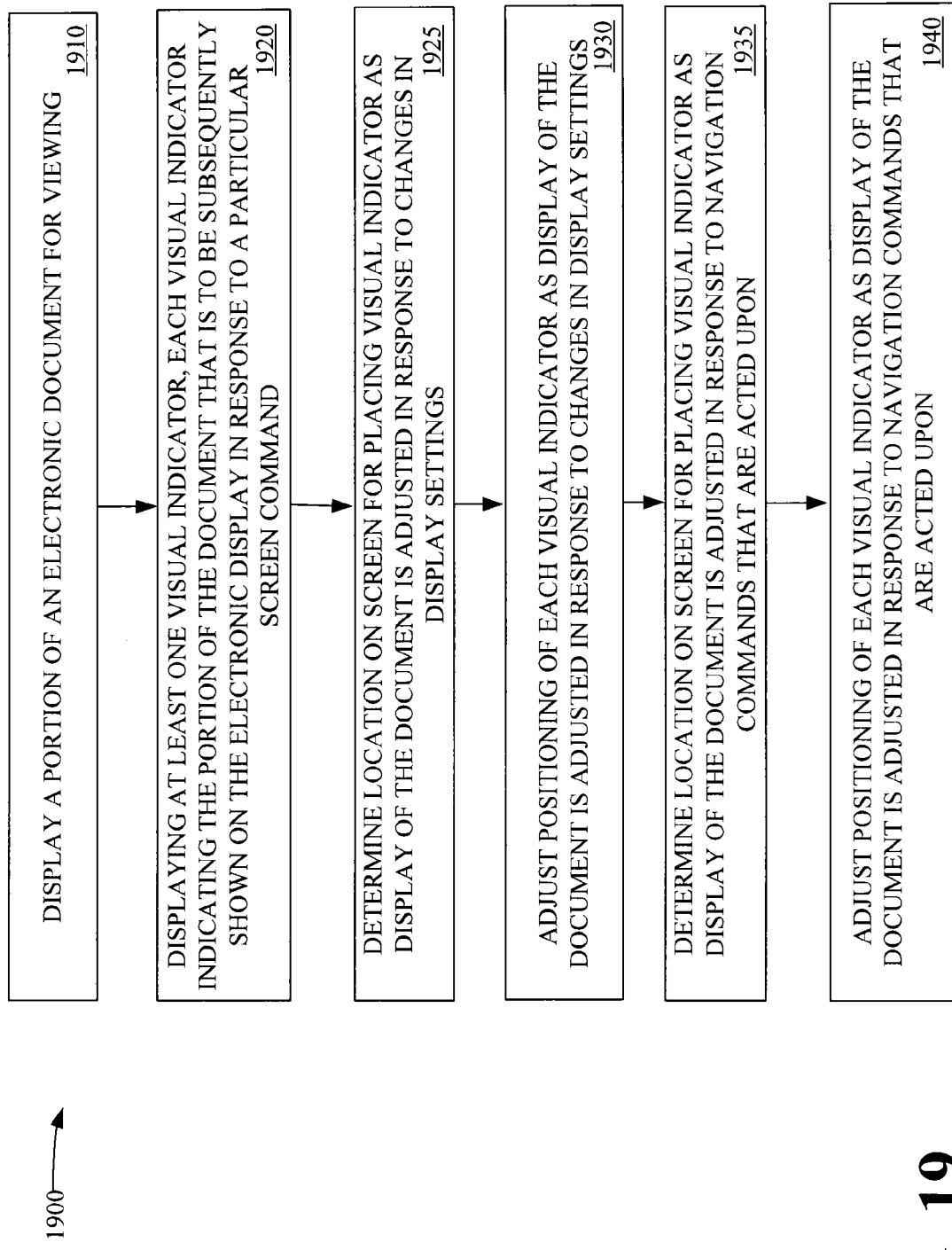
FIG. 19 is a flow chart describing one embodiment of a process for viewing an electronic document in accordance with the device of FIG. 1.

Referring now to FIG. 19, a flow chart is shown describing one embodiment of a process (1900) for viewing an electronic document. First, in block 1910, a portion of an electronic document is displayed for viewing by a user. Further, at least one visual indicator is also displayed, as shown in block 1920. Each displayed visual indicator indicates the portion of the document that is to be subsequently shown on the electronic display in response to a particular screen command. Accordingly, a location on the screen for placing a visual indicator is determined (1925) and the positioning of each visual indicator is adjusted (1930) as the display of the document is adjusted in response to changes in display settings. Also, at steps 1935-1940, a location on the screen for placing a visual indicator is determined and the positioning of each visual indicator is adjusted as display of the document is adjusted in response to navigation commands that are acted upon by a viewer 115.

When the screen indicator system 110 is implemented in software, as is shown in FIG. 1, it should be noted that the screen indicator system 110 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The screen indicator system 110 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the screen indicator system 110 is implemented in hardware, the screen indicator system 110 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In some embodiments, the screen indicator system 110 is implemented in software and may be implemented as an auxiliary "plug-in" or "widget" which affects the display of documents generated by another program or application. For example, in such an approach, the screen indicator system may transparently perform a screen down and a screen up operation for a given page, then process the resulting display information to determine where to position one or more visual indicators. Additionally, in some embodiments, the screen indicator system 110 may be incorporated into a software application, where the software application implements a visual indication as a part of a display management portion of the software application. Further, in some embodiments, the screen indicator system 110 may provide visual indicators showing the portion of the content of an electronic document that is to be shown in response to a navigation command to scroll content to the left or to the right within a display area, as may be useful with devices with small displays, such as personal digital assistants (PDAs).

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A system for viewing electronic documents on an electronic display, comprising:
 a hardware processor;
 an electronic viewer application to display contents of an electronic document, the electronic document comprising a first portion of the contents and a second portion of the contents, wherein the first portion of the contents precedes the second portion of the contents within an organizational format of the electronic document; and
 a visual indicator logic for displaying a first visual indicator on the electronic display of contents of the electronic document, wherein the contents being displayed includes the first portion and the second portion, the first visual indicator indicating the second portion of the contents which is currently being displayed that will be displayed in a following screen of content in response to a selection of a next screen command, selection of the next screen command causing the second portion of the contents which is currently being displayed and non-displayed content which follows the currently displayed second portion of the contents to be shown, wherein the first portion is not displayed after selection of the next screen command, wherein the second portion of the contents precedes the non-displayed content within the organizational format of electronic document.

2. The system of claim 1, wherein the first visual indicator comprises a horizontal bar delineating the second portion of the contents that is to be subsequently displayed in response to the next screen command.

3. The system of claim 1, wherein the first visual indicator comprises an area of semi-transparent shading overlapping the second portion of the contents that is to be subsequently displayed in response to the next screen command.

4. The system of claim 1, wherein the first visual indicator comprises a geometric symbol positioned near the portion of the second contents that is to be subsequently displayed in response to the next screen command.

5. The system of claim 1, wherein the first visual indicator logic activates displaying of the first visual indicator in response to user command.

6. The system of claim 5, wherein the user command comprises movement of an input mouse control within a particular area of the electronic display.

7. A method for viewing electronic documents on an electronic display, comprising:
 a computer displaying a portion of an electronic document for viewing on the electronic display, the electronic document comprising a first portion of the contents and a second portion of the contents, wherein the first portion of the contents precedes the second portion of the contents within an organizational format of the electronic document; and
 the computer displaying a first visual indicator within the electronic display of contents of the electronic document, wherein the contents being displayed includes the first portion and the second portion, the first visual indicator indicating the second portion of document contents which is currently being displayed that will be displayed in a following screen of content in response to a selection of a next screen command, selection of the next screen command causing the second portion of the document contents which is currently being displayed and non-displayed document content which follows the currently displayed second portion of the document contents to be shown, wherein the first portion is not displayed after selection of the next screen command, wherein the second portion of the contents precedes the non-displayed content within the organizational format of electronic document.

8. The method of claim 7, further comprising:
the computer adjusting positioning of the first visual indicator as display of the document is adjusted in response to changes in display settings.

9. The method of claim 8, further comprising:
the computer adjusting positioning of the first visual indicator as display of the document is adjusted in response to one or more navigation commands that are acted upon.

10. The method of claim 7, wherein the first visual indicator comprises a horizontal bar delineating the second portion of the document contents that is to be subsequently displayed in response to the next screen command.

11. The method of claim 7, wherein the first visual indicator comprises an area of semi-transparent shading overlapping the second portion of the document contents that is to be subsequently displayed in response to the next screen command.

12. The method of claim 7, wherein the first visual indicator comprises a geometric symbol positioned near the second portion of the document contents that is to be subsequently displayed in response to the next screen command.

13. The method of claim 7, further comprising:
the computer calculating a location of the display where a top of the next screen of document content will reside, wherein the first visual indicator is positioned at the location within the display to indicate the second portion of document contents which is currently being displayed that will be displayed in a following screen of content in response to a selection of the next screen command.

14. A computer readable storage medium having a computer program for viewing electronic documents on an electronic display, the program having instructions for performing:
displaying a portion of an electronic document for viewing on the electronic display, the electronic document comprising a first portion of the contents and a second portion of the contents, wherein the first portion of the contents precedes the second portion of the contents within an organizational format of the electronic document; and
displaying a first visual indicator within the electronic display of contents of the electronic document, wherein the contents being displayed includes the first portion and the second portion, the first visual indicator indicating the second portion of document contents which is currently being displayed that will be displayed in a following screen of content in response to a selection of a next screen command, selection of the next screen command causing the second portion of the document contents which is currently being displayed and non-displayed document content which follows the currently displayed second portion of the document contents to be shown, wherein the first portion is not displayed after selection of the next screen command, wherein the second portion of the contents precedes the non-displayed content within the organizational format of electronic document.

15. The computer readable storage medium of claim 14, the program further performing:
adjusting positioning of the first visual indicator as display of the document is adjusted in response to changes in display settings.

16. The computer readable storage medium of claim 15, the program further performing:
adjusting positioning of the first visual indicator as display of the document is adjusted in response to one or more navigation commands that are acted upon.

17. The computer readable storage medium of claim 14, wherein the first visual indicator comprises a horizontal bar delineating the second portion of the document contents that is to be subsequently displayed in response to the next screen command.

18. The computer readable storage medium of claim 14, wherein the first visual indicator comprises an area of semi-transparent shading overlapping the second portion of the document contents that is to be subsequently displayed in response to the next screen command.

19. The computer readable storage medium of claim 14, wherein the first visual indicator comprises a geometric symbol positioned near the second portion of the document contents that is to be subsequently displayed in response to the next screen command.

20. The computer readable storage medium of claim 14, the program further performing:
calculating a location of the display where a top of the next screen of document content will reside, wherein the first visual indicator is positioned at the location within the display to indicate the second portion of document contents which is currently being displayed that will be displayed in a following screen of content in response to a selection of the next screen command.

* * * * *